United States Patent [19]

Sakaguchi et al.

[11] Patent Number: 4,689,538
[45] Date of Patent: Aug. 25, 1987

[54] DRIVING DEVICE HAVING TACTILITY

[75] Inventors: Yuji Sakaguchi, Kawasaki; Tatuo Terahama, Kunitachi, both of Japan

[73] Assignee: Bridgestone Corporation, Tokyo, Japan

[21] Appl. No.: 906,059

[22] Filed: Sep. 11, 1986

[30] Foreign Application Priority Data

Sep. 11, 1985 [JP] Japan .................................. 60-199314

[51] Int. Cl.$^4$ ............................................ G05B 19/42
[52] U.S. Cl. ...................................... 318/568; 901/22; 901/37
[58] Field of Search ............... 318/568, 568 I; 901/22, 901/37; 364/513

[56] References Cited

U.S. PATENT DOCUMENTS

| Re. 28,089 | 7/1974 | Devol | 901/22 X |
| Re. 28,437 | 6/1975 | Devol | 901/22 X |
| 4,601,000 | 7/1986 | Montabert | 901/22 X |
| 4,645,084 | 2/1987 | Deike | 901/22 X |

FOREIGN PATENT DOCUMENTS 0759308 10/1980 U.S.S.R. ................................ 901/22

Primary Examiner—Benjamin Dobeck
Attorney, Agent, or Firm—Sughrue, Mion, Zinn, Macpeak and Seas

[57] ABSTRACT

A driving device having tactility includes at least one set of two elastic extensible and contractible bodies having one ends connected to a stationary portion of the device and the other ends connected to a driven member driven by contractive force in axial directions of said elastic bodies caused by expanded diameters by introducing pressurized fluid into the elastic bodies. The driving device comprises detecting means for detecting movements of said driven member, valve means for supplying and exhausting the pressurized fluid into and out of the respective elastic bodies, positioning means for actuating the valve means in response to output signals from the detecting means to position the driven member in predetermined positions, and control means for comparing output signals from the detecting means produced by external actions on the driven member positioned in at least one predetermined position with a reference level to control the positioning means. The driving device can perceive external actions acting on the overall device without requiring any separate tactile sensor.

6 Claims, 4 Drawing Figures

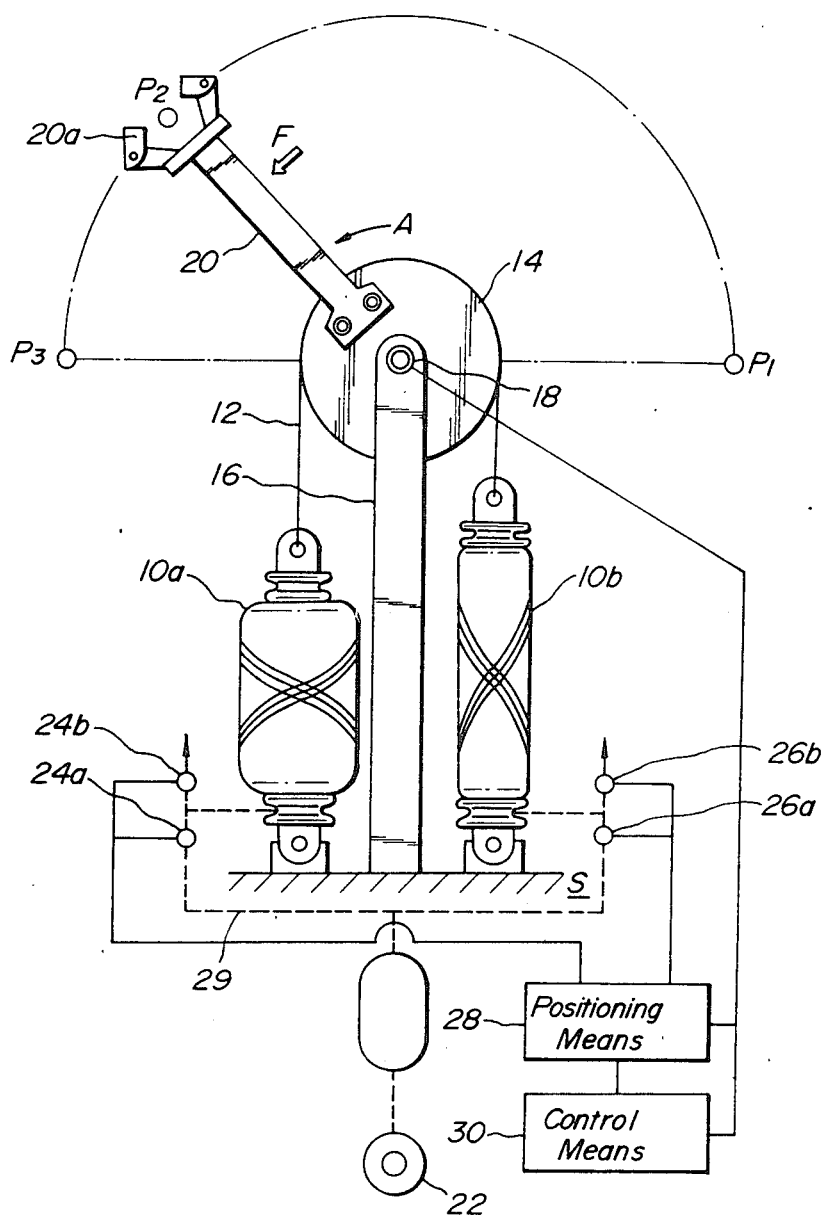
FIG_1a

FIG_1b
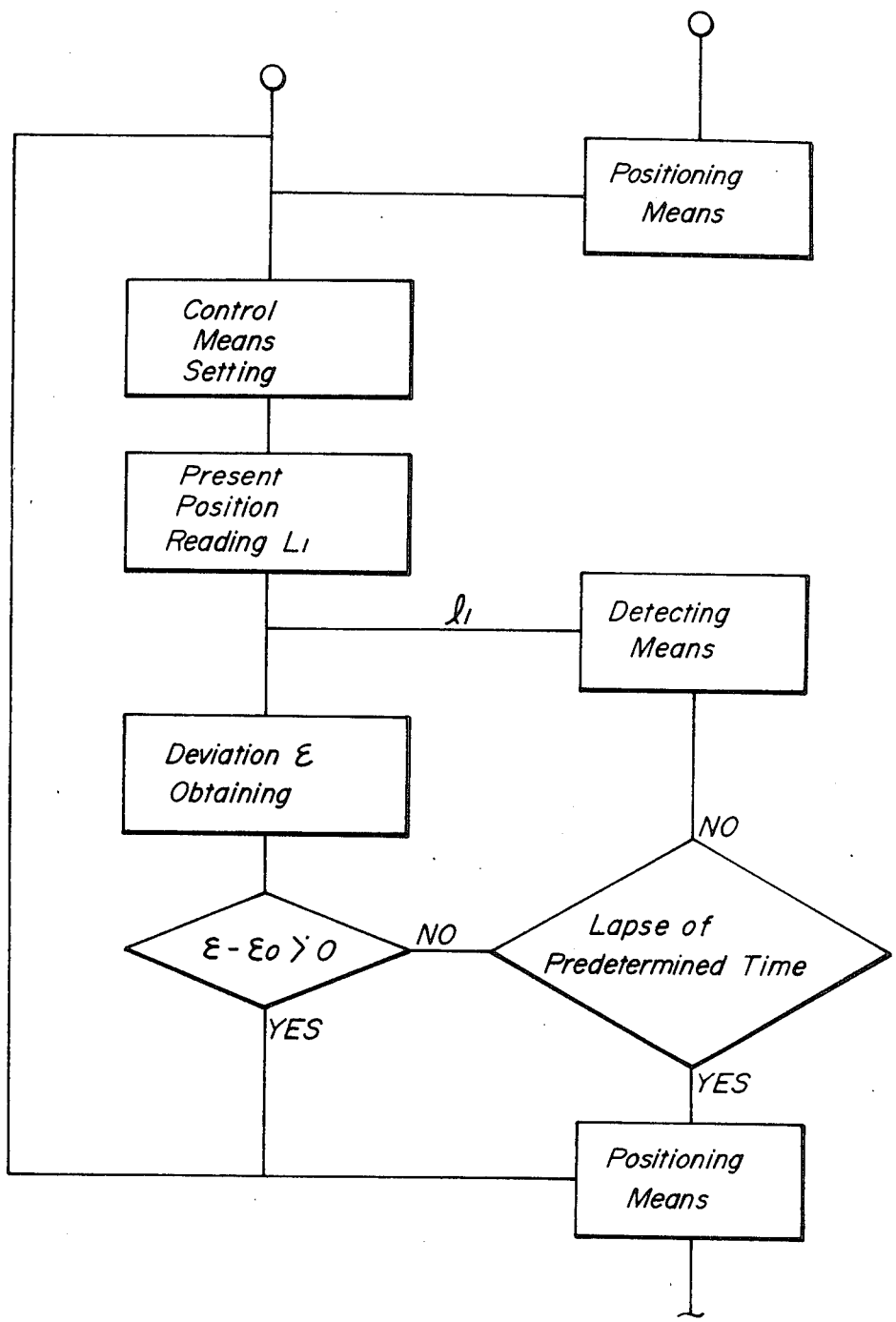

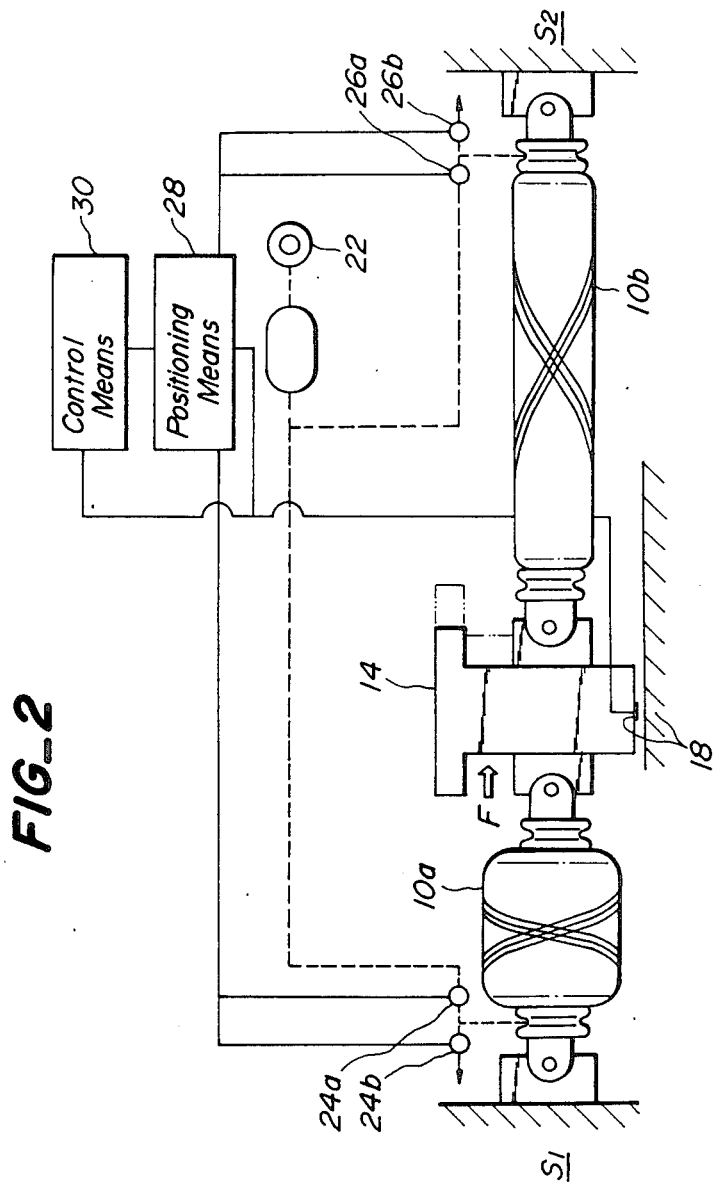
FIG_2

DRIVING DEVICE HAVING TACTILITY

BACKGROUND OF THE INVENTION

This invention relates to a driving device having tactility including air-bag type elastic extensible and contractible bodies producing contractive force in axial directions caused by expanded diameters by introducing pressurized fluid into the elastic bodies.

As robot instruments have been introduced into industrial fields and robot systems have been hard investigated, various kinds of devices adaptable to external changes, in other words having faculties such as senses of touch, sight and the like have been studied and developed.

With such devices, in usual tactile sensors, for example, on-off switches, strain gages or the like are provided at grasping portions or load-cells are provided between grasping portions and arms, so that when objects are grasped, grasping conditions thereof are perceived on the basis of electric signals caused in such tactile sensors.

In such devices, therefore, separate tactile sensors are needed and such sensors are required to be located in relatively narrow limited zones at the grasping portions, so that the mounting of the sensors are difficult and quite bothersome in manufacturing the devices.

With the devices using the load-cells, moreover, as the load-cells, themselves are heavy and bulky, the devices, themselves are unavoidably large-sized.

In the above hitherto used devices, furthermore, only the portions equipped with the tactile sensors have tactile faculties, so that tactile performances are not sufficiently exhibited as entire devices.

SUMMARY OF THE INVENTION

It is an object of the invention to provide an improved driving device having tactility which uses air-bag type elastic extensible and contractible bodies of light weight and eliminates all the disadvantages of the prior art and which is light and inexpensive without requiring any separate strain gages, load-cells and the like.

In order to achieve this object, in a driving device having tactility including at least one set of two elastic extensible and contractible bodies having one ends connected to a stationary portion and the other ends connected to a driven member driven by contractive force in axial directions of said elastic bodies caused by expanded diameters by introducing pressurized fluid into said elastic bodies, the device according to the invention comprises detecting means for detecting movements of said driven member, valve means for supplying and exhausting the pressurized fluid into and out of the respective elastic bodies, positioning means for actuating said valve means in response to output signals from said detecting means to position said driven member in predetermined positions, and control means for comparing output signals from said detecting means produced by external actions on the driven member positioned in at least one predetermined position with a reference level to control said positioning means.

In a preferred embodiment of the invention, the driven member is a rotatable circular member rotatably supported by a support arm, around which circular member extends a line member whose ends are connected to the other ends of the elastic bodies, and the detecting means is secured to a shaft of rotatable circular member.

In another embodiment of the invention, the driven member is a member capable of doing translational motion and the other ends of the elastic bodies are connected to the member.

According to the invention, the supply and exhaust of the pressurized fluid into and from the respective elastic bodies are adjusted by means of the valve means so as to control the contractive forces caused in the elastic bodies to give the driven member the rotating movement and/or translational motion. Moreover, the movement of the driven member is detected by the detecting means, the driven member can be stopped at predetermined positions by actuating the valve means by means of the positioning means in response to output signals from the detecting means. Furthermore, the duration of the stoppage of the driven member at the stopped position or the time interval for actuating the valve means is freely set by the positioning means.

In this manner, when the driven member arrives at a predetermined stopping position, the control means is set to receive signals from the detecting means. The driven member is connected to the air-bag type elastic bodies, so that when external force acts on the driven member, it can move somewhat from its equilibrium position owing to the compressibility of the fluid as the air accommodated in the elastic bodies. In spite that the positioning means does not actuate the valve means, the detecting means produces output signals in response to the displacement of the driven member. Then, the control means compares the output signal with the predetermined reference level. If the output signal is larger than the reference level, the control means sends a signal to the positioning means which actuates the valve means to displace the driven member according to the predetermined sequence.

In order that the invention may be more clearly understood, preferred embodiments will be described, by way of example, with reference to the accompanying drawings.

BRIEF DESCRIPTION OF THE DRAWINGS

FIG. 1a is a schematic view illustrating a driving device according to the invention;

FIG. 1b is a block diagram illustrating the operation of the device shown in FIG. 1a;

FIG. 2 is a schematic view illustrating another embodiment of the invention.

DESCRIPTION OF THE PREFERRED EMBODIMENTS

Figure 3:
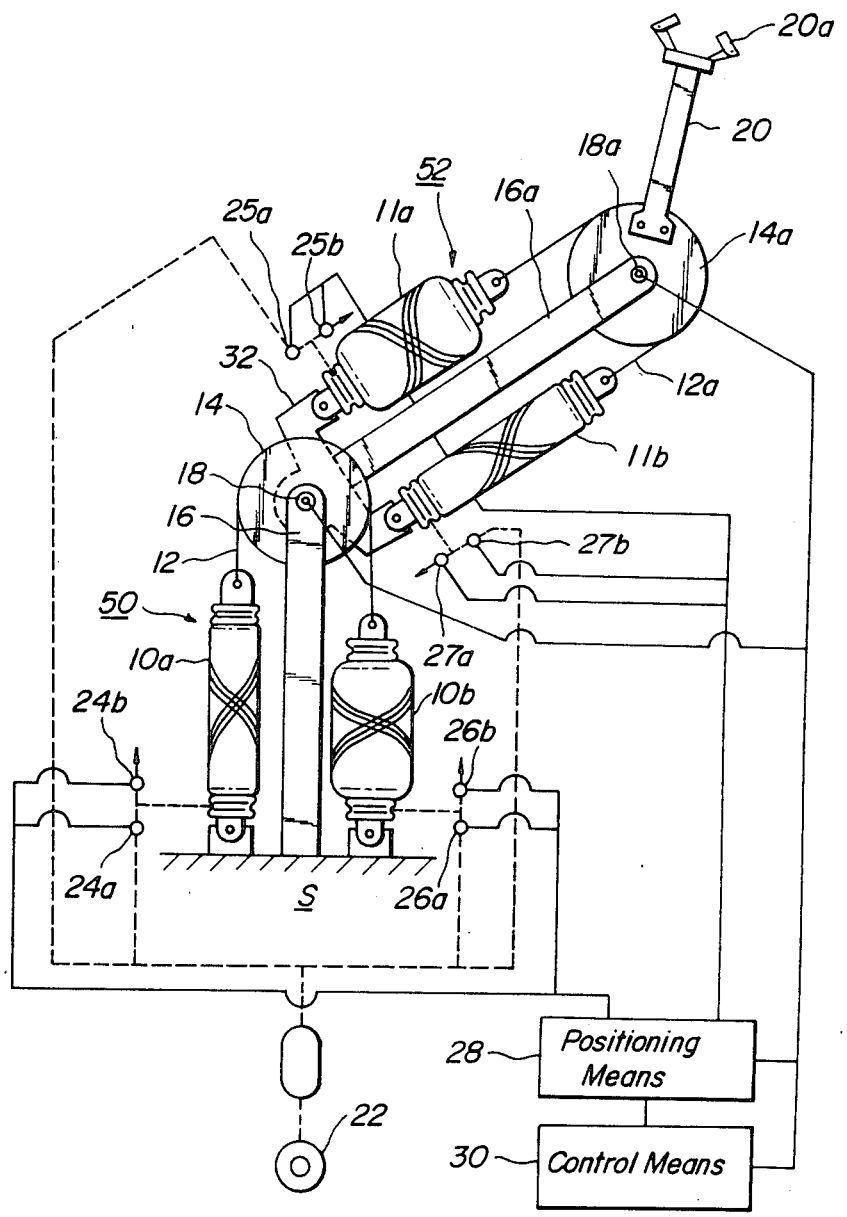
FIG. 3 is a schematic view illustrating a further embodiment of the invention.

FIG. 1a schematically illustrates a driving device having tactility according to the invention, including elastic extensible and contractible bodies or actuators 10a and 10b. An air-bag type elastic extensible and contractible body disclosed for example in Japanese Patent Publication Application No. 40,378/77 is suitable for this purpose. It comprises a tubular body made of a rubber or rubber-like elastomeric material, a reinforcing braided structure of organic or inorganic high tensile fibers, for example, aromatic polyamide fibers for covering the tubular body, and closure members for closing both ends of the tubular body. A pressurized fluid is applied into the tubular body through a fitting provided on one of the closure members so as to expand to increase its diameter, thereby producing contractive force in an axial direction of the body.

One ends of the elastic bodies 10a and 10b are connected to a stationary wall S, while the other ends of the elastic bodies are connected to ends of a line member 12. In this manner, the elastic bodies 10a and 10b are indirectly connected through the line member 12 to a driven member or a pulley 14 in this embodiment. Although one set of two elastic bodies have been used in this embodiment, this is only by way of example and the invention is not limited to the number of the elastic bodies. The line member 12 may be a rope made of a synthetic resin or a metal which is flexible and of less elongation. Instead of the rope, a chain may be used in which case, a sprocket is used instead of the pulley.

The driven member 14 is rotatably journaled by support arms 16 fixed to the stationary member S. To a shaft for journaling the driven member 14 is secured detecting means 18 for example a rotary encoder for detecting the movement of the driven member 14. To the driven member 14 is secured a grasping arm 20 having fingers 20a at its end for performing grasping. The fingers 20a perform grasping operations with the aid of driving means (not shown). However, the fingers 20a will not be described in further detail, since they are not directly associated with the invention.

In order to rotate the grasping arm 20 about an axis of the driven member 14 in a direction shown by an arrow A in FIG. 1a, the pressurized fluid is supplied into the elastic body 10a, while the pressurized fluid is exhausted from the elastic body 10b.

For this purpose, with the device according to the invention, to a pressurized fluid supply source as a compressor 22 is connected a pressurized fluid supply line 29 including flow control valves 24a, 24b and 26a and 26b to supply pressurized fluid into cavities of the elastic bodies 10a and 10b. In this case, the flow control valves are preferably able to adjust their opening degrees by means of positioning means 28. For example, the control valve 24a is opened, while the control valve 24b is closed to increase the pressure acting in the elastic body 10a so as to cause larger contractive force in the body 10a. In contrast herewith, the control valve 24a is closed, while the control valve 24b is opened to lower the pressure in the body 10a so as to reduce the contractive force caused in the elastic body 10a. It holds true in the control valves 26a and 26b associated with the other elastic body 10b. The control valves for this purpose are, for example, valves capable of freely adjusting their opening degrees in response to electric signals, for example, solenoid or magnetic flow control valves.

The positioning means 29 serves to stop the grasping arm 20 at one or plural locations and hold it thereat for a period of time in accordance with a predetermined sequence in response to output signals from the detecting means. It is preferable that the positioning means 29 is able to change the procedures including the stopping time of the grasping arm 20. As soon as the grasping arm 20 arrives at a predetermined stop position according to the signals from the detecting means 18, the positioning means 28 holds the flow control valves closed for a predetermined period of time.

The driving device according to the invention comprises the air-bag type elastic extensible and contractible bodies which drive the grasping arm 20 to predetermined positions. Accordingly, if a physical relation between members of the device other than the support arms 16 occurs or in more concretely an external force more than a certain strength acts on the members, a relative displacement is caused between the support arms 16 and the grasping arm 20 owing to the compressibility of the air accommodated in the elastic bodies and their elasticity. This phenomenon does not occur in transmission motors or hydraulic actuators. This relative displacement is detected by the detecting means 18.

According to the invention, therefore, the external force is detected or perceived by the detecting means 18, control means 30 connected thereto and actuated in response to signals from the control means 30 and the positioning means 28 connected to the control means. When the grasping arm 20 arrives at a predetermined position and the flow control valves are held closed by the positioning means 28, the control means is set to receive the output signal from the detecting means 18 so as to judge whether the output signal is larger or smaller than or equal to a reference level. If it is larger than the level, the positioning means 28 is forced to a next step by the control means 30 without awaiting the lapse of time predetermined for holding the grasping arm 20. On the other hand, if the output signal from the detecting means 18 is substantially equal to or smaller than the reference level, the control means 30 does not operate and after the lapse of time predetermined for holding the grasping arm 20, the control means 30 is reset. Thereafter, the positioning means adjusts the valve openings of the respective flow control valves to cause the grasping arm 20 to perform a predetermined movement in response to signals from the detecting means 18 according to a predetermined sequence.

Although the positioning means 28 and the control means 30 have been explained as separate means in this embodiment, they may be formed as a unitary body. Moreover, the above operation of the control means 30 is effected for the respective stopping positions of the grasping member. It may be effected for particular positions of the grasping member.

FIG. 1b is a block diagram illustrating the operation of the control means 30. When the grasping arm 20 moves from an initial position $P_1$ to a predetermined position $P_2$, the control means 30 is set by means of the positioning means 28 to receive the signals from the detecting means 18 with suitable sampling intervals. In the control means 30, the signal $l_1$ received from the detecting means 18 is compared with an output signal $L_1$ from the detecting means 18 corresponding to the predetermined position $P_2$ of the grasping arm 20 to obtain a deviation $\epsilon$. If the deviation $\epsilon$ is larger than a reference level $\epsilon_0$, the control means 30 produces and sends a signal to the positioning means 28 and is automatically reset. In contrast herewith, if the deviation $\epsilon$ is smaller than or equal to the reference level $\epsilon_0$, the sampling is continued. Upon the lapse of time for stoppage of the grasping arm, the control means 30 is automatically reset.

FIG. 2 illustrates another embodiment of the invention, wherein like components are designated by the same reference numerals as those in the first embodiment.

A driving device shown in FIG. 2 is intended to give a driven member 14 a translational motion. For this purpose, elastic extensible and contractible bodies 10a and 10b are connected in series with their one ends through the driven member 14. The other ends of the elastic bodies 10a and 10b are connected to stationary portions $S_1$ and $S_2$. As the driven member 14 performs the translational motion, detecting means capable of measuring linear displacements of the driven member 14 is used, for example, linear encoder, linear displacement type potentiometer or the like which is different from the detecting means used in the first embodiment. The operation of the driving device in this embodiment will not be described in further detail since it is substantially the same as that of the first embodiment.

FIG. 3 illustrates a further embodiment of the invention, wherein like components are designated by the same reference numerals as those in the first embodiment.

A driving device shown in this embodiment is of a combination of two assemblies similar to that shown in FIG. 1a. A first assembly denoted as a whole by reference numeral 50 includes a driven member 14 to which is fixed a bracket 32 forming a stationary portion of a second assembly 52 instead of a grasping arm. The fixed bracket 32 is therefore rotated together with the driven member 14 about a rotating center thereof by supplying and exhausting pressurized fluid into and from the elastic bodies 10a and 10b of the first assembly 50.

On the other hand, to the fixed bracket 32 is fixed one end of a support arm 16a having the other end rotatably journaling a driven member 14a. A line member 12a extends around the driven member 14a. Respective ends of the line member 12a are connected to one ends of elastic extensible and contractible bodies 11a and 11b whose other ends are connected to the fixed bracket 32. To the driven member 14a is fixed a grasping arm 20 having fingers 20a secured thereto. Accordingly, the grasping arm 20 can be moved into various positions not only by the movement of the fixed bracket by supplying and exhausting the pressurized fluid into and out of the elastic bodies of the first assembly but also the movement of the driven member 14a by supplying and exhausting the pressurized fluid into and out of the elastic bodies of the second assembly. The first and second assemblies may of course be actuated simultaneously.

With such a driving device, external forces acting upon the device can be perceive on the basis of signals from the detecting means 18 and 18a provided in the first and second assemblies for detecting displacements of the driven members.

In more detail, control means 30 receives from the detecting means 18 and 18a any change caused by a physical relation with external on the driven members 14 and 14a including the grasping arm 20 brought into a predetermined position by means of the positioning means 28. The control means 30 compares the received signals $l_1$ and $l_2$ with signals $L_1$ and $L_2$ from the respective detecting means at predetermined positions of the driven members to obtain deviations $\epsilon_1$ and $\epsilon_2$. The maximum deviation $\epsilon_{max}$ among the deviations $\epsilon_1$ and $\epsilon_2$ is compared with a reference level $\epsilon_0$. If the $\epsilon_{max}$ is more than $\epsilon_0$, it is judged that the device has been subjected to an external action. The control means produces a signal corresponding to this judgement into the positioning means and is reset to cause the positioning means to progress into a next step.

In contrast herewith, if the $\epsilon_{max}$ is less than $\epsilon_0$, the sampling is to be continue in the same manner as in the first embodiment shown in FIG. 1a. The predetermined position may of course be freely selected. In judging the external action, it may be judged as to only one assembly. Moreover, particular deviations may be weighted or weighted deviations may be used so as to be able to select external actions in particular directions.

It is further understood by those skilled in the art that the foregoing description is that of preferred embodiments of the disclosed devices and that various changes and modifications may be made in the invention without departing from the spirit and scope thereof. For example, the assembly driving a driven member in translational motions and the assembly rotatively driving a driven member may be combined. Furthermore, a plurality of assemblies may be connected by means of universal joints to form a driving device.

As can be seen from the above description, the driving device according to the invention uses air-bag type elastic extensible and contractible bodies capable of producing contractive forces in their axial directons by changing their diameters by supplying and exhausting pressurized fluid into and out of the bodies to position a driven member on the basis of signals from detecting means for detecting movements of the driven member and to perceive movements of the driven member caused by external action when stopped on the basis of signals from the detecting means. The driving device according to the invention can perceive external actions acting on the overall device without requiring any separate tactile sensor and is quite different from a device of the prior art of which only portion provided with a tactile sensor perceives an external action. Therefore, the device according to the invention is superior in versatility or adaptability.

What is claimed is:

1. A driving device having tactility including at least one set of two elastic extensible and contractible bodies having one ends connected to a stationary portion and the other ends connected to a driven member driven by contractive force in axial directons of said elastic bodies caused by expanded diameters by introducing pressurized fluid into said elastic bodies, said device comprising detecting means for detecting movements of said driven member, valve means for supplying and exhausting the pressurized fluid into and out of the respective elastic bodies, positioning means for actuating said valve means in response to output signals from said detecting means to position said driven member in predetermined positions, and control means for comparing output signals from said detecting means produced by external actions on the driven member positioned in at least one predetermined position with a reference level to control said positioning means.

2. A driving device as set forth in claim 1, wherein said driven member is a rotatable circular member rotatably supported by a support arm, around which circular member extends a line member whose ends are connected to the other ends of the elastic bodies.

3. A driving device as set forth in claim 2, wherein said detecting means is secured to a shaft of said rotatable circular member.

4. A driving device as set forth in claim 1, wherein said driven member is a member capable of doing translational motion and the other ends of said elastic bodies are connected to the member.

5. A driving device as set forth in claim 1, wherein said driven member is a rotatable circular member around which extends a line member whose ends are connected to the other ends of the elastic bodies, wherein to said rotatable circular member is fixed a fixed bracket having a support arm fixed thereto, and wherein said support arm rotatably supports a rotatable circular member around which extends a line member whose ends are connected to one ends of a further set of two elastic extensible and contractible bodies whose other ends are connected to said fixed bracket.

6. A driving device as set forth in claim 5, wherein said detecting means is secured to a shaft of said first mentioned rotatable circular member and further detecting means is secured to a shaft of said second mentioned rotatable circular member.

* * * * *